April 27, 1943.  H. S. DRUM ET AL  2,317,896
MOUNTING FOR HEAT RESPONSIVE INSTRUMENTS USED IN YARN PACKAGE DRYING
Filed Aug. 12, 1941  2 Sheets-Sheet 1

Inventors
Harry S. Drum
and William C. Dodson
By Barr, Borden & Fox
Attorneys

April 27, 1943.      H. S. DRUM ET AL      2,317,896
MOUNTING FOR HEAT RESPONSIVE INSTRUMENTS USED IN YARN PACKAGE DRYING
Filed Aug. 12, 1941      2 Sheets-Sheet 2

Inventors.
Harry S. Drum
and William C. Dodson
By Barr, Borden & Fox,
Attorneys.

Patented Apr. 27, 1943

2,317,896

UNITED STATES PATENT OFFICE 2,317,896

MOUNTING FOR HEAT RESPONSIVE INSTRUMENTS USED IN YARN PACKAGE DRYING

Harry S. Drum and William C. Dodson, Abington, Pa., assignors to Smith, Drum and Company, Philadelphia, Pa., a corporation of Pennsylvania Application August 12, 1941, Serial No. 406,498

13 Claims. (Cl. 34—105)

The present invention relates to yarn package drying apparatus and more particularly to the mounting of and positioning of a control instrument for association with a package of yarn during a drying operation.

Since the device of the present invention is more particularly for use with yarn packages, it may be well to explain that such a package is formed of a quantity yarn wound with an axial bore into more or less of a cylindrical shape. The outside diameter of such packages varies depending upon whether a fine or coarse yarn is used, the amount of yarn wound upon the tubular core, and the tension used during the winding step. As a result of these factors the diameter of a package may range from three to five and one half inches. It is evident, therefore, that unless a control instrument is always located at the same relative point there will be a complete discrepancy in results. The exact point to locate such a control instrument has been determined after extensive experimentation.

Some of the objects of the present invention are to provide an improvement for use in yarn package drying; to provide means for mounting a heat responsive device for association with a yarn package while undergoing drying treatment; to provide means for locating a heat responsive instrument within a yarn package at a predetermined distance from the outer surface of such a package; to provide a self-adjusting support for a heat responsive instrument which is arranged to position the instrument at the same relative distance from the outer surface of a yarn package regardless of variations in size of such package; and to provide other improvements as will hereinafter appear.

Figure 1:
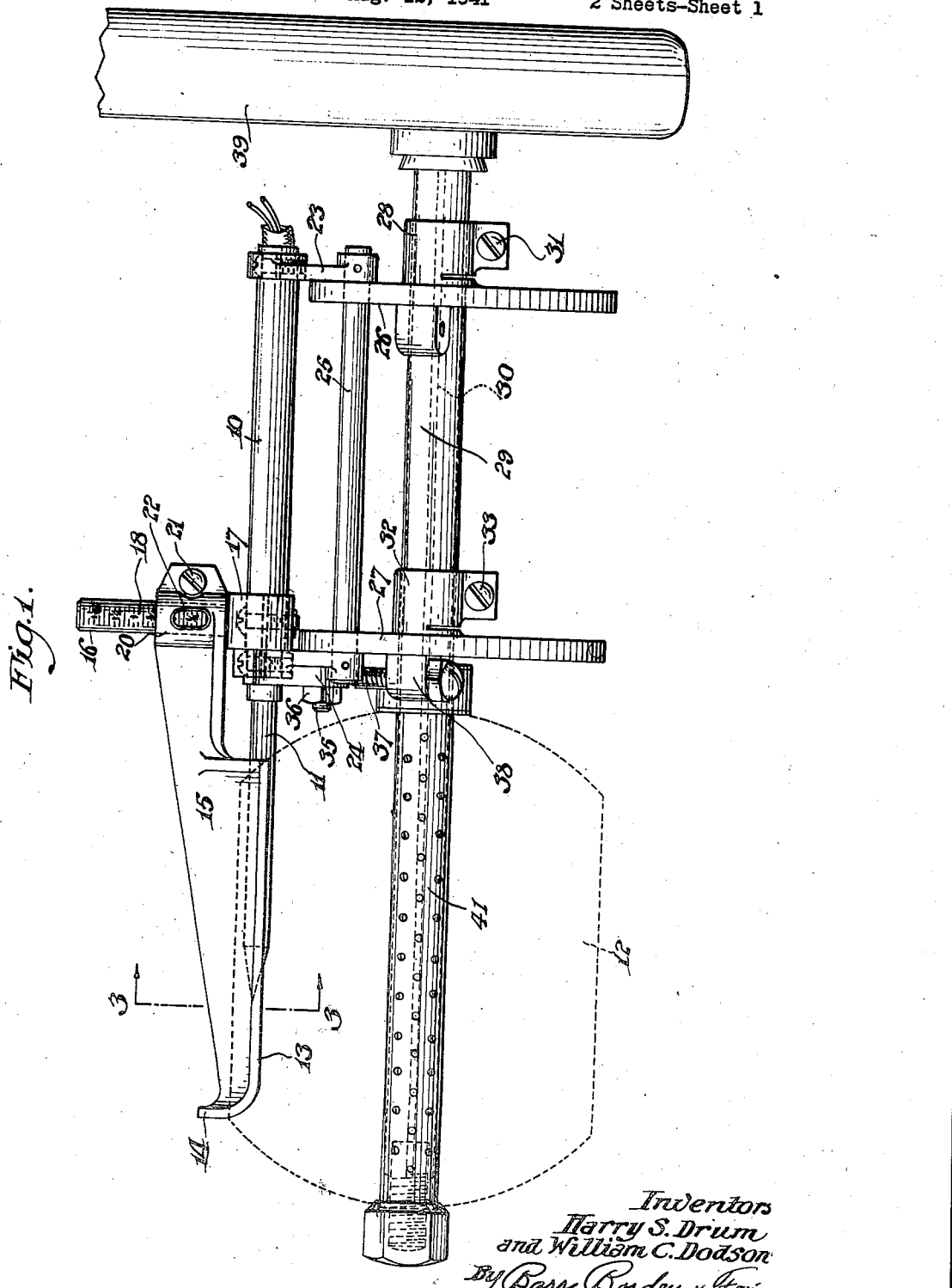
Figure 2:
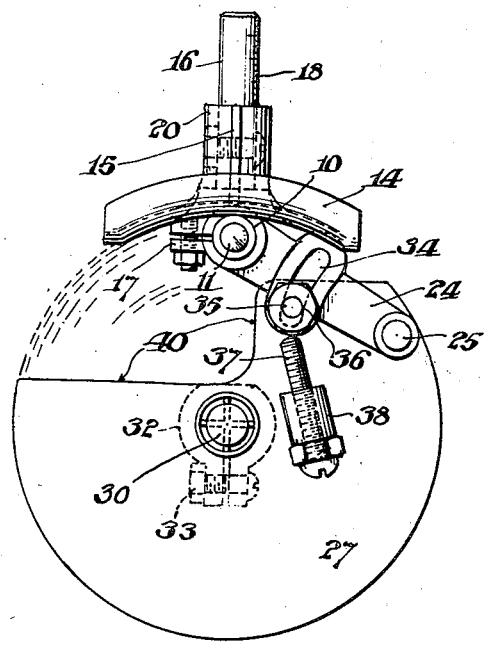
Figure 3:
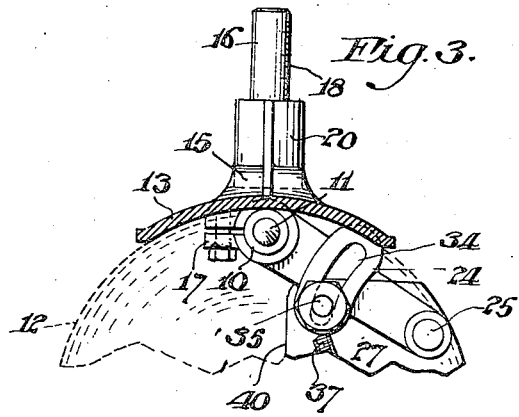

In the accompanying drawings Fig. 1 represents a side elevation of one form of instrument mounting embodying the present invention, the same being shown in operative association with a yarn package spindle of a package drying machine; Fig. 2 represents an end elevation of the same; and Fig. 3 represents a detail section on line 3—3 of Fig. 1.

Referring to the drawings one form of the invention consists of a holder in the form of an elongated sleeve 10 arranged to fit snugly about a control instrument 11, such as a thermometer, pyrometer, or other condition responsive device, and support it in operative position. As shown a portion of the instrument 11 projects from the sleeve 10 in order to be thrust into a yarn package 12 (shown in dotted lines). Preferably the piercing end of the instrument tapers to a point for easy penetration of the yarn and to prevent damage to the fibers. For most effective operation the instrument is inserted parallel to the axis of the package and may be located at any selected distance from the outer surface of the package. In some instances it may be located close to the outer surface, and in other instances relatively close to the axis. In the former location it will indicate total drying of the package, and in the latter drying conditions near the center. The instrument 11 is of the type which will close an electric circuit or generate a current to operate certain control mechanisms, such as fully shown and described in applicants' co-pending application Ser. No. 380,758.

For the purpose of fixing the point of entry of the thermal responsive instrument relative to the outer surface of a yarn package in order that there may be uniformity in results where a number of instruments are used with respective packages, a gauge plate 13 is provided of generally arcuate shape to conform to the contour of the outer surface of a yarn package. The length of this gauge plate 13 corresponds substantially to the length of the package, and its width is such as will self-seat in stable relation upon the package. Since the instrument is fixed in position and the package is moved toward the point of the instrument, the outer end of the gauge plate 13 is flared outwardly and upwardly to form a guide 14 to properly direct the package in its movement towards and about the instrument 11. The gauge plate 13 is carried by an arm 15 projecting laterally and horiozntally from a vertically disposed post 16, which is anchored to the sleeve 10 by a strap clamp 17. The post 16 is preferably provided with a graduated scale 18 and the arm 15 is carried thereon by an adjustable clamping hub 20. By loosening the hub screw 21, the hub 20 can be shifted on the post 16 to adjust the gauge plate 13 a selected distance from the instrument. Thus the instrument can be set to enter the package at a predetermined distance from the outer surface of the package, and this distance can be varied at will to meet different drying conditions or different size packages. The graduations may be in inches and fractions of an inch, or any other standard of linear measure, and in the present instance are visible through a slot 22 provided in a side of the hub 20.

In order to support the instrument holder or sleeve 10, it is carried by two spaced arms 23 and 24, pinned or otherwise made fast to a rock-shaft 25 which has bearings in two support plates 26 and 27. The plate 26 has a split hub 28 to fit about an imperforate tube 29 and to be fastened thereto by tightening a bolt 31 or other fastening means. The plate 27 has a split hub 32 to also fit about the tube 29 and to be fastened thereto by tightening a bolt 33 or other fastening means. The tube 29, plates 26 and 27 with associated parts form one means to support the instrument 11 in position to enter a yarn package at a selected location with respect to the axis of the package. The tube 29 fits snugly over the inner end portion of an air conveying yarn supporting spindle 30, which is one of a number of such spindles projecting from and communicating with a carrier manifold 39. The type of carrier indicated is one wherein each spindle mounts two yarn packages in co-axial relation and hence, for convenience in using the present invention, the innermost yarn package on selected spindles is removed and its place taken by the mounting for the instrument 11. The outer end portion of such selected spindles receives the tubular yarn package after the instrument is correctly located, either with respect to the outer face of the package or its axis. The selected spindles are at different locations about the carrier in order to approximate an average condition for all of the yarn packages. As shown the thermometer or other condition instrument when properly mounted extends parallel to the spindle in position to pierce and enter a package as the latter is moved axially onto the spindle to take its normal treating position. In so entering the package the instrument is guided by the guide 13 which to be fully effective meets the package well in advance of the instrument. Since the arms 23 and 24 are free to swing relative to the end plates 26 and 27, the gauge plate 13 becomes self adjustable for different diameters of packages, and hence ensures that the instrument 11 enters all packages at the same distance from outer surface of such packages.

In order that the gauge plate 13 may be set in any selected position, the arm 24 is formed with a transverse arcuate slot 34 concentric with the shaft and slidably receiving a threaded pin 35, which is fast to and projects from one face of the plate 27. A nut 36 threads on the end of the pin 35 and can thus clamp the arm 24 in its selected or adjusted position. The inward swing of the arm 24 can be limited by an adjustable stop in the form of a screw 37 located in the path of arm 24 and threaded through a boss 38 on the plate 27. Setting in a selected position is only useful where packages of uniform diameter are being treated, or for some specific test purpose, and it is to be understood that in normal use the gauge and its associated instrument are free to float in order to self adjust the instrument for entrance into all packages at the same distance from the outer surface thereof.

While in the foregoing reference has been made more specifically to an instrument responsive to thermal conditions, the invention is not limited to such an instrument since it may be found desirable to measure humidity conditions in which case the proper instrument for that purpose would be employed.

Having thus described our invention, we claim:

1. In combination, an indicating instrument responsive to changes in the value of a condition, means to support a tubular yarn package, means adjustably mounting said instrument relative to said supporting means to pierce and enter said package, a guide gauge, and means to support said gauge to contact the outer surface of said yarn package, said gauge and instrument being relatively superposed, whereby said instrument is caused to enter said package a distance from the outer surface of said package.

2. In combination, an indicating instrument responsive to changes in the value of a condition, means to support a tubular yarn package, means adjustably supporting said instrument relative to said supporting means to pierce and enter said package, a guide gauge, means to support said gauge to contact the outer surface of said yarn package, said gauge and instrument being relatively superposed, whereby said instrument is caused to enter said package a distance from the outer surface of said package, and means to vary the distance between said gauge and instrument.

3. In combination, a spindle for supporting a yarn package, a support arranged to be mounted in coaxial alignment with said spindle, an indicating instrument responsive to changes in the value of a condition, means pivotally attached to said support for mounting said instrument substantially parallel to said support and radially spaced therefrom, a guide gauge carried by said mounting means and located on the opposite side of said instrument from said support for contact with the surface of said package, and means to fix the distance of said gauge from said instrument.

4. In combination, a spindle for supporting a yarn package, a support arranged to be mounted in coaxial alignment with said spindle an indicating instrument responsive to changes in the value of a condition, means pivotally mounting said instrument substantially parallel to said support and spaced therefrom to enter said package as the latter contacts said instrument, a guide gauge carried by said mounting means in position to contact said yarn package in advance of said instrument, and means to vary the distance between said gauge and said instrument.

5. In combination, a spindle for supporting a yarn package, a support arranged to be mounted in coaxial alignment with said spindle, an indicating instrument responsive to changes in the value of a condition, means to mount said instrument substantially parallel to said support and spaced therefrom to enter said package as the latter contacts said instrument, and a guide gauge carried by said mounting means in position to contact said yarn package in advance of said instrument, said guide conforming substantially to the configuration of said yarn package, whereby said instrument enters said package at a predetermined distance from said guide gauge.

6. In combination, a spindle for supporting a yarn package, a support arranged to be mounted in coaxial alignment with said spindle, an indicating instrument responsive to changes in the value of a condition, means to mount said instrument on said support substantially parallel to said support and spaced therefrom to enter said package as the latter contacts said instrument, and means adapted to contact the surface of said package and to guide said instrument into said package at a selected distance from the outer surface thereof.

7. In combination, a spindle for supporting a yarn package, a support arranged to be mounted in coaxial alignment with said spindle, an indicating instrument responsive to changes in the value of a condition, means to mount said instrument substantially parallel to said support and spaced therefrom to enter said package as the latter contacts said package, means adapted to contact the surface of said package and to guide said instrument into said package at a selected distance from the outer surface of said package, and means to adjust said contact means to vary said selected distance at will.

8. In combination, a spindle for supporting a yarn package, a support arranged to be mounted in coaxial alignment with said spindle, an indicating instrument responsive to changes in the value of a condition, and means to mount said instrument on said support substantially parallel thereto and spaced therefrom to pierce and enter said package.

9. In combination, a manifold for conducting air under pressure, a spindle, for receiving a tubular yarn package, communicating with said manifold and with said package, an indicating instrument responsive to changes in the value of a condition within said package, and means operatively associated with said spindle for mounting and guiding said instrument to pierce and enter said package at a predetermined location.

10. In combination, an indicating instrument responsive to changes in the value of a condition, means to support a yarn package, means adjustably mounting said instrument relative to said supporting means to pierce and enter said package, a guide gauge, and means to support said gauge to contact the outer surface of said yarn package before said package comes into engagement with said instrument.

11. In combination, an indicating instrument responsive to changes in the value of a condition, a spindle for receiving a yarn package, and means operatively associated with said spindle to support and guide said instrument to pierce and enter said package at a selected location.

12. In combination, a spindle for mounting yarn packages of varying outside diameters, a condition responsive instrument juxtaposed to said spindle, and a gauge operably associated in adjustable spaced coupled relation to said instrument for engaging the outer periphery of any yarn package to aline said instrument in selected package piercing position.

13. In combination, a manifold for conducting a treating medium, a spindle for receiving a tubular yarn package and communicating with said manifold and with said package; a support pivoted in coaxial relation to said spindle, a guide gauge carried by said support in position to seat upon the outer periphery of a yarn package on said spindle, a condition responsive instrument also carried by said support, in position to pierce and enter said package, and means to adjust the position of said instrument relative to said gauge, whereby said instrument enters said package at a selected distance from the said periphery.

HARRY S. DRUM.
WILLIAM C. DODSON.